United States Patent [19]
Netzer

[11] Patent Number: 5,930,383
[45] Date of Patent: Jul. 27, 1999

[54] DEPTH SENSING CAMERA SYSTEMS AND METHODS

[76] Inventor: Yishay Netzer, Yuvalim, Doar Na Misgav, Israel

[21] Appl. No.: 08/718,829

[22] Filed: Sep. 24, 1996

[51] Int. Cl.$^6$ .............................. G09K 9/00; G09K 9/36
[52] U.S. Cl. ......................... 382/154; 382/106; 382/285
[58] Field of Search ................................... 382/154, 106, 382/286, 141, 148, 293, 201, 276, 285; 356/375, 1, 4, 2, 5, 141, 352, 98, 108, 125; 348/47, 217, 218, 42, 139, 43, 46, 48, 50, 207

[56] References Cited

U.S. PATENT DOCUMENTS

| | | | |
|---|---|---|---|
| 3,775,735 | 11/1973 | Funk et al. | 340/4 R |
| 4,601,053 | 7/1986 | Grumet | 382/100 |
| 4,687,325 | 8/1987 | Corby | 356/1 |
| 4,873,651 | 10/1989 | Raviv | 364/513 |
| 4,963,017 | 10/1990 | Schneiter et al. | 356/403 |
| 5,513,276 | 4/1996 | Theodoracatos | 382/154 |

*Primary Examiner*—Jose L. Couso
*Assistant Examiner*—Duy M. Dang
*Attorney, Agent, or Firm*—Mark M. Friedman

[57] ABSTRACT

This invention relates to a method and apparatus for sensing a three-dimensional (depth and illuminance) image of a scene. It is based on the inverse-square law relating the incident brightness on an area illuminated by a light point source, to its distance from the point source. In the preferred embodiment of the invention the scene is sequentially illuminated by more than one light point source each at a pre calibrated location in the reference coordinate system. The resulting reflections from the field of-view are sensed by a stationary digital camera that maps each scene element into a corresponding image pixel, to provide a 2-dimensional brightness map that contains the photometric values of each image pixel for each specific illumination. Each pixel photometric value depends on the illumination incident on the corresponding scene element which, in itself, is further determined by the element inherent Lambertian reflectance-coefficient at the illumination wavelength, the element orientation relative to the coordinate system, and the element illuminance as determined by the point source brightness and the distance separating the point source and the scene element. Each brightness map is different from its sequel due to the differing point-source locations. By manipulating the brightness maps the spatial location of each scene element relative to the fixed point sources is determined, thus yielding a depth-image as well as a brightness-image.

13 Claims, 4 Drawing Sheets

DEPTH SENSING CAMERA SYSTEMS AND METHODS

FIELD AND BACKGROUND OF THE INVENTION

The present invention relates to systems for imaging three-dimensional surfaces, and in particular, it concerns methods and systems for deriving depth information from variations in intensity when an object scene is illuminated by different light sources.

It is known to use various techniques to produce three-dimensional images, i.e., images containing information about the subject scene in three-dimensions. Three-dimensional imaging is of particular importance in the field of computerized imaging for sensing object shape, especially in artificial intelligence applications such as robotic object sorting, and in product dimensional inspection.

Conventional three-dimensional imaging techniques are of three main types: stereoscopic imaging in which depth is derived from parallax by identifying corresponding features in two different views of an image; optical radar techniques based on time-of-flight of reflected light; and patterned light illumination. These techniques are all well known for those familiar with the art and will not be described here in detail. An overview of the state of art as it is known to the inventor may be found in "Optics, Illumination, and Image Sensing for Machine Vision VIII" [SPIE Proceedings Vol. 2065, September 1993], which is hereby incorporated in its entirety as if fully set out herein.

Each of the conventional techniques suffers from serious shortcomings. Stereoscopic imaging presents problems of correlation between features of the two images, particularly in cases of smooth featureless surfaces. Optical radar and patterned light illumination, on the other hand, require highly complex hardware or are limited to sensing coarse features of the subject.

There is therefore a need for a simple yet effective method and system for deriving depth information relating to points in an image, in particular, for small objects and close ranges.

SUMMARY OF THE INVENTION

The present invention is of depth sensing camera systems and methods.

According to the teachings of the present invention there is provided, a method for deriving depth information associated with pixels of an image sensed by a digital camera, each pixel corresponding to a surface element of a subject scene, the method comprising the steps of: (a) generating a first intensity map of the subject scene while the subject scene is illuminated by a first light source positioned in a first known geometrical relation to the digital camera; (b) generating a second intensity map of the subject scene while the subject scene is illuminated by a second light source positioned in a second known geometrical relation to the digital camera; (c) generating a third intensity map of the subject scene while the subject scene is illuminated by a third light source positioned in a third known geometrical relation to the digital camera; (d) generating a fourth intensity map of the subject scene while the subject scene is illuminated by a fourth light source positioned in a fourth known geometrical relation to the digital camera; and (e) processing the measured intensity values of corresponding pixels of the first, second, third and fourth intensity maps to derive information relating to the depth of the corresponding surface element of the subject scene.

According to a further feature of the present invention, a smoothing algorithm is employed for rejecting local depth errors due to specular reflection.

According to a further feature of the present invention, additional intensity maps of the subject scene are generated while the subject scene is illuminated by additional light sources each positioned in different known geometrical relation to the digital camera so as to minimize the chance of erroneous depth calculation due to specular reflection.

According to a further feature of the present invention, a calibration intensity map is generated of the subject scene illuminated only by background illumination, and wherein the processing includes subtracting the calibration intensity map from each of the first, second and third intensity maps.

According to a further feature of the present invention, each of the first, second, third and fourth light sources approximates to a point source with respect to the area of the object scene.

According to a further feature of the present invention, the processing derives information relating to the orientation of the corresponding surface element of the subject scene.

According to a further feature of the present invention, the processing derives information relating to the Lambertian reflection coefficient of the corresponding surface element of the subject scene.

There is also provided, according to the teachings of the present invention, a depth sensing camera system for generating three-dimensional information about an object scene, the system comprising: (a) a digital camera having a field of view including the object scene; (b) a first light source positioned in a first known geometrical relation to the digital camera for illuminating the object scene; (c) a second light source positioned in a second known geometrical relation to the digital camera for illuminating the object scene; (d) a third light source positioned in a third known geometrical relation to the digital camera for illuminating the object scene; (e) a fourth light source positioned in a fourth known geometrical relation to the digital camera for illuminating the object scene; (f) a control system for sequentially activating each of the light sources such that the digital camera generates a first image of the object scene illuminated by the first light source, a second image of the object scene illuminated by the second light source, a third image of the object scene illuminated by the third light source, and a fourth image of the object scene illuminated by the fourth light source; and (g) a processor for processing the first, second, third and fourth images to derive depth information relating to at least some points of the object scene.

According to a further feature of the present invention, the first, second and third light sources are arranged substantially collinearly According to a further feature of the present invention, each of the light sources approximates to a point source with respect to the area of the object scene.

According to a further feature of the present invention, each of the light sources is an LED.

According to a further feature of the present invention, each of the light sources is an illuminated optical fiber.

According to a further feature of the present invention, the digital camera is a line detector employing a linear array of detector elements, the system further comprising means for generating relative movement of the object scene relative to the digital camera in a direction perpendicular to the linear array.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of depth sensing camera systems and methods.

The principles and operation of systems and methods according to the present invention may be better understood with reference to the drawings and the accompanying description.

Figure 1:
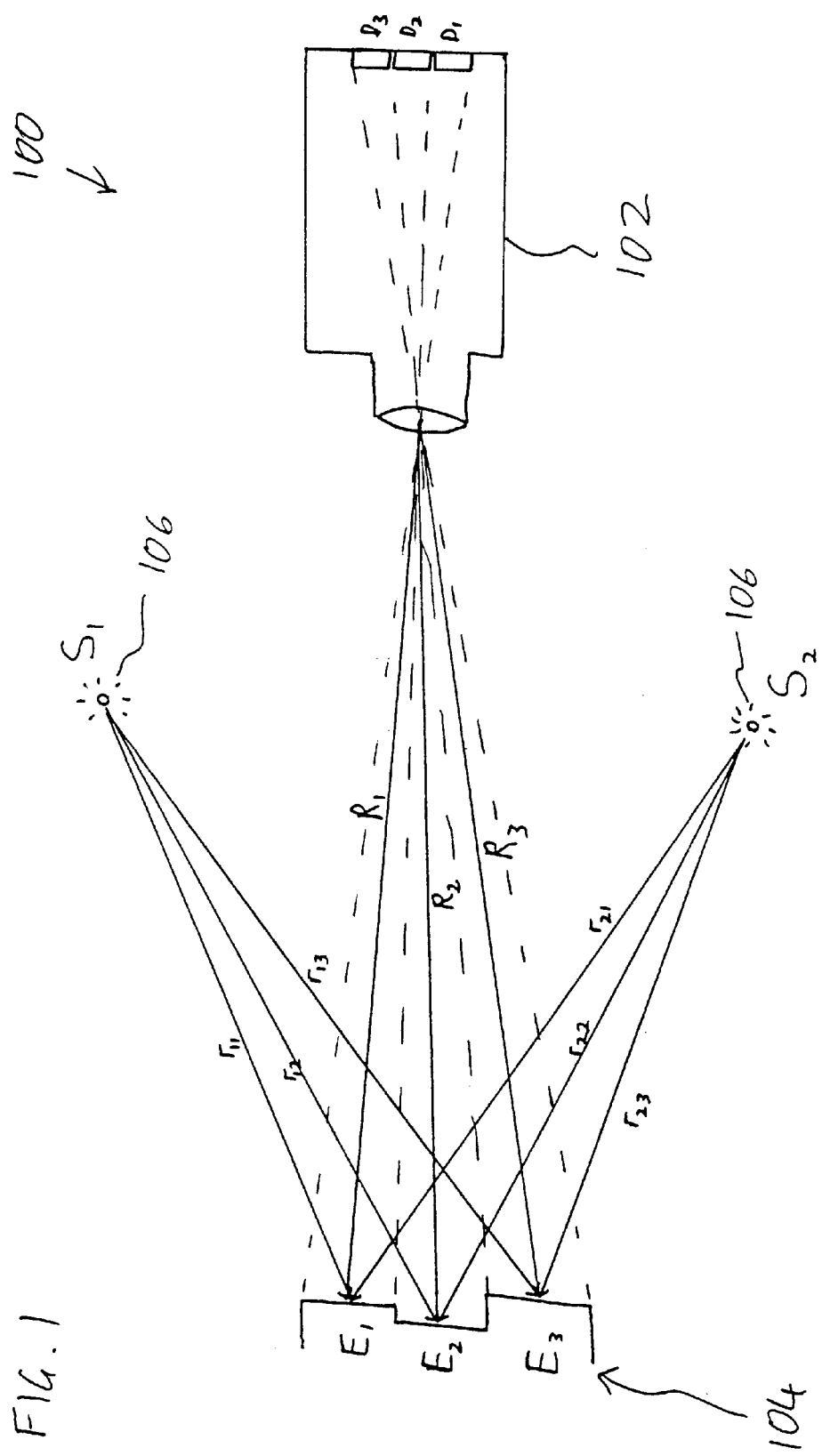
FIG. 1 is a simplified representation of a depth sensing camera system, constructed and operative according to the teachings of the present invention.

Referring now to the drawings, FIG. 1 shows a simplified representation of a system, generally designated 100, constructed and operative according to the teachings of the present invention, to illustrate the underlying concept of the present invention. System 100 includes a digital camera 102 arranged to view an object scene 104 illuminated alternately by a number of point light sources 106. In this simplified representation, camera 102 is shown having three detector elements $D_1 \ldots D_3$ which measure luminant intensity received from three incident directions corresponding to three elemental scene areas $E_1 \ldots E_3$, respectively. Object scene 104 is illuminated, in turn, by each point source 106, designated $S_1$ and $S_2$, respectively, and an intensity map made up of the received intensities from all of the elemental scene areas is measured.

The objective of the system and method of the present invention is to determine the length of a vector, denoted $R_1 \ldots R_3$, from the nodal point of camera 102 to each elemental scene area, thereby supplementing the directly measured two-dimensional image with depth information. Although the position of point sources 106 relative to camera 102 is known, and the direction to each scene element is defined by the position of the corresponding detector element, more information is required to fully define a triangle made up of lines between camera 102, a point light source 106 and a given scene element.

The intensity of illumination of a scene element $E_j$ by a point source $S_i$, denoted $i_{ij}$, varies in proportion to the inverse square of the distance between the point source and the scene element $r_{ij}$. As a result, measurements of the intensity produced by a scene element when illuminated by several different point sources provide information about the relative distances from each source to the scene element. In reality, the differing orientation presented by the scene elements relative to the different point sources further complicates calculations. As a result, at least four light sources are required to produce sufficient information to eliminate all the unmeasured parameters, as will be described below.

In more precise terms, the invention relies on the fact that the sensed illuminance of a particular elemental scene area (ESA) in the field-of-view of a given stationary camera and illuminated by a point light source (PLS) depends on the ESA reflectivity, spatial orientation and distance relative to the PLS, and on the intensity of the PLS. The sensed ESA illumination is independent of its distance from the camera collecting aperture as long as the ESA is generally uniform over the field of view of the corresponding pixel detector element in the camera, i.e., it is an "extended source". By illuminating the ESA with a number of PLS's in different positions, the location of the ESA relative to the illuminating point sources and the camera can be determined regardless of the particular reflectivity of the ESA.

A number of approximations, including the aforementioned extended source assumption, will be used in order to simplify explanation of the principles of the present invention. It should be understood, however, that redundancy of available measurements, together with any a priori information available about the nature of the object scene, can readily be employed to perform various corrections to the basic technique described herein where particularly high precision is needed from the depth sensing camera system (DSCS). Examples of typical techniques of correction for approximations of the type used herein are described in an article entitled "3-D Stereo Using Photometric Ratios" which is included in the SPIE Proceedings reference cited above (pp. 194–210). Additional corrections serve to equalize the illumination pattern of the practical point source (typically a Light emitting Diode or an illuminated fiber optic).

Turning now to the features of depth sensing camera system 100 in more detail, camera 102 may be any type of digital camera which provides quantitative intensity measurements of high accuracy. Examples of suitable devices include, but are not limited to, charge-coupled devices (CCD), charge-injection devices (CID) and MOS sensor arrays.

Light sources 106 are chosen according to the scale of the intended application. For applications in which the object scene is of the order of $10^{-2}$ m, a standard LED chip without a lens may be used. In this context, it should be understood that the light source need only approximate to a point source with respect to the subject scene area. In the case of an LED, its output pattern is in fact non-uniform, but may approximate to point source properties with respect to a solid angle falling within its beam. For even smaller ranges, one end of an optic fiber illuminated at its remote end may be used.

Figure 2:
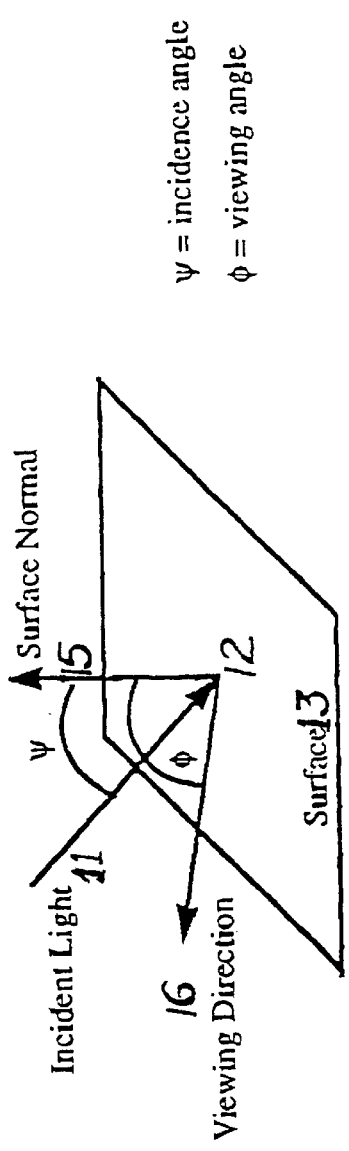
FIG. 2 is a schematic diagram showing the nomenclature used to represent Lambertian reflection from an elemental scene area illuminated from a given direction.

FIG. 2 illustrates the reflection of a light ray 11 incident on ESA 12 on an illuminated object surface 13 at angle ψ relative to normal 15 to the ESA. The reflected light includes two components. The first, the specular component (not shown), is the result of the mirror-like reflection characteristic of an imaged object surface 13. It is directed in accordance with the well known geometrical optics reflection law, i.e., it depends on the angle ψ between incident light ray 11 and the normal 15. The second component, the Lambertian reflection component $L_r$ is evenly diffused over a hemisphere and its integrated intensity inside a solid angle dw corresponding to the field of view of the pixel detector size centered around viewing direction 16 at angle φ to the normal 15 is dependent on the illuminating ray intensity L, on the Lambertian reflection coefficient ρ at point 12 and on the cos ψ, as described by the well known Lambert formula:

$$L_r = L \; \rho \cos \psi \; d\omega \quad (1)$$

In an ideal Lambertian surface the specular reflection is zero, and the diffused intensity is independent of the viewing angle φ. In reality, as described on page 197 of the above-referenced SPIE Proceedings, the actual diffused reflection depends somewhat on φ and may have to be corrected, as mentioned above.

Figure 3:
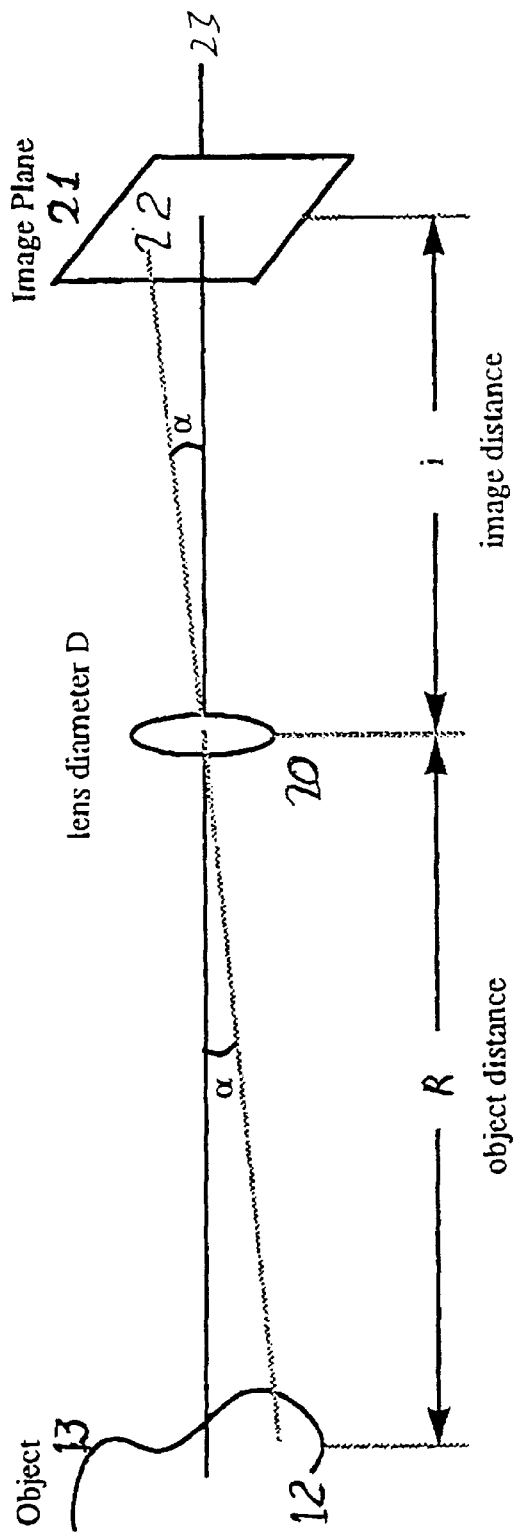
FIG. 3 is a schematic diagram illustrating the viewing geometry of a depth sensing camera system, constructed and operative according to the teachings of the present invention, employed to view an illuminated elemental scene area.

FIG. 3 illustrates a viewing device, a digital camera, which is the optical receiver of the DSCS. The camera includes a light collecting lens 20 of diameter D. The image irradiance E on the respective detector element 22 in the image plane 21 of the camera will be given by the following formula (see p. 96 of above-referenced SPIE Proceedings):

$$E = L_r(\pi/4)(D/i)^2 \cos^4\alpha \qquad (2)$$

where:

i is the distance between the collecting lens aperture and the image plane 21;

D is the diameter of lens 20;

α is the angle between the optical axis of lens 20 and the direction 23 to the object point 12; and $L_r$ is the reflected radiance from ESA 12.

The camera output signal $V_s$ for each image plane element is proportional to the element irradiance E and is given by:

$$V_s = k E \qquad (3)$$

where k is a proportionality factor that can be determined by calibration. A possible calibration process may consist on viewing a distant evenly illuminated Lambertian surface. The camera conversion factor of received light to pixel signal output is known based on geometrical optics to be proportional to $\cos^4\alpha$. In practice it will deviate from this relationship due to imperfections of lens 20 as well as photon detectivity variations over the image plane 22. These errors combined with the above errors can be canceled out by the above calibration process and the combined correction factors for the entire field-of-view be contained in a look-up table. The camera is thus converted into an equalized photometer that accurately measures the illuminance of each ESA in its field-of-view.

It should be appreciated that, in accordance with equation (1), the orientation of the ESA relative to the camera is immaterial to the determination of the brightnesses of the ESA's. The orientation of the ESA's relative to the light sources, on the other hand, does affect the measured illuminance.

The three-dimensional position of each ESA is determined by the direction cosines and the length of a radius vector from the camera nodal point to the ESA. As already mentioned, the direction cosines are defined by the position of the corresponding pixel in the recorded image. In other words, each ESA is defined as the part of the object scene of which the intensity is measured by a given camera detector element corresponding to a small solid angle in a known direction from the camera. In more precise terms, the radius vector is an extension of the line from a given pixel in the image plane of the camera through the nodal point of its collecting optics. The length of the radius vector to a given ESA is to be derived from the photometric values measured by the corresponding pixel under different illumination conditions by substitution into equations (1) and (2).

A single illuminating source is insufficient for calculating the length of the radius vector since the solution involves four unknowns: the ESA spatial orientation (defined in three-dimensions by two angles), its reflection coefficient, and its distance from the illuminating source. Typically, measurements with a point light source in four different positions will provide sufficient information to derive values for all four unknowns, including the length of the radius vector.

Figure 4:
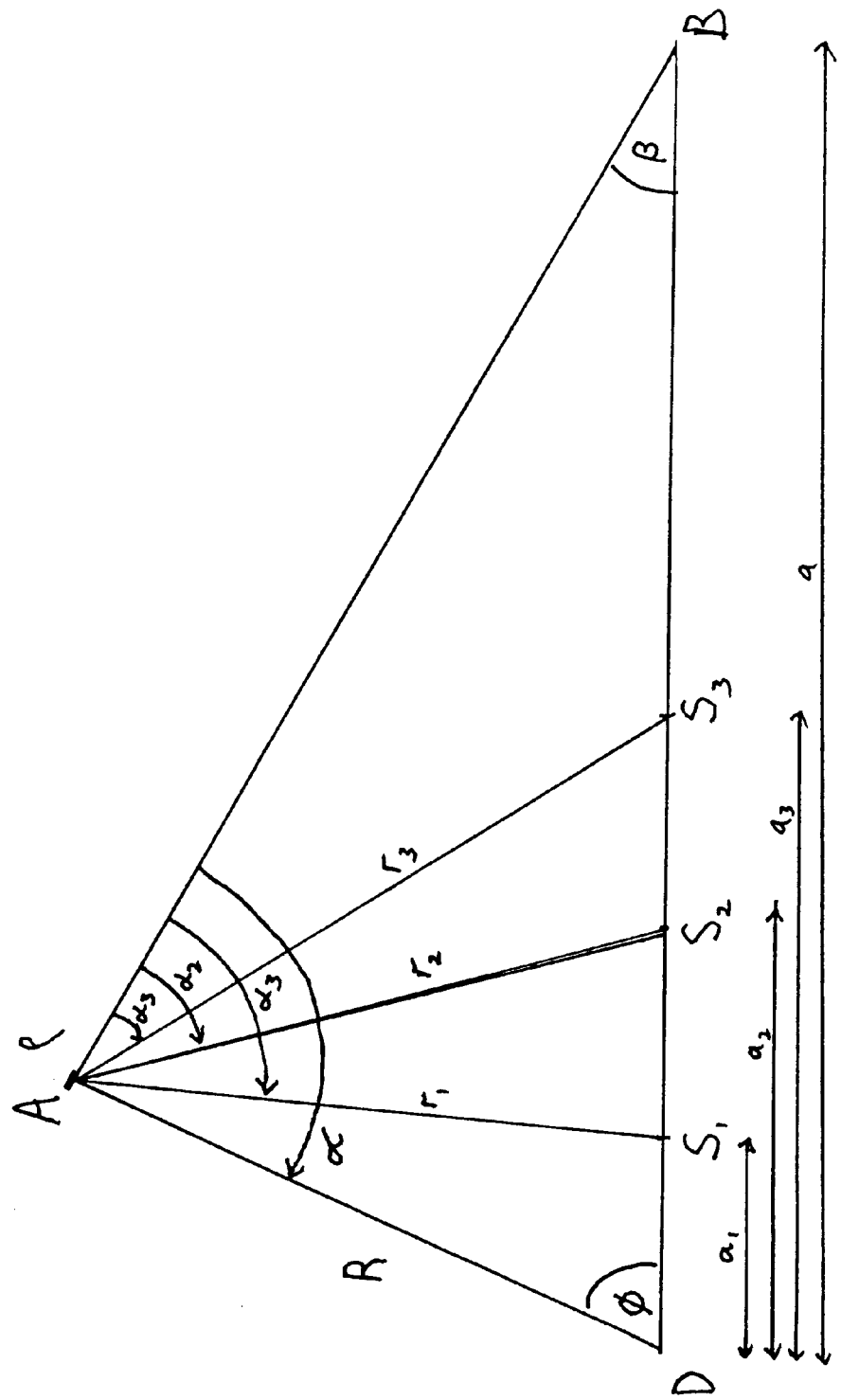
FIG. 4 is a schematic diagram of the geometry of a two dimensional depth sensing camera system, constructed and operative according to the teachings of the present invention, illustrating the various parameters employed in its calculations.

FIG. 4 shows the geometrical arrangement of elements for a simplified two-dimensional case, illustrating the various parameters relevant to the required calculations. The DSCS is shown with three point light sources, denoted $S_1$–$S_3$, and the nodal point, or effective nodal point, of the digital camera, denoted D. To simplify calculations, all the sources and the nodal point of the camera are arranged collinearly. The arbitrary line along which they lie will be referred to as the "base-line". The known distance between the point D and each light source $S_i$ is denoted $a_i$.

A sample ESA is located at a point A, the line from A to D forming an angle φ to the base-line. The angle φ is known directly from the position of the corresponding camera pixel. The distance from D to A, denoted R, is to be derived. The range of variation of R over the ESA is assumed to be small.

The remaining unknown quantities to be derived are the Lambertian reflection coefficient ρ and the spatial orientation of the ESA. In a real three-dimensional case, the spatial orientation is defined by two angles, but for the purposes of illustration we consider a two dimensional case in which the angle between the surface of the ESA and the vector from A to D is denoted α. The point B represents the intersection of the extrapolated ESA surface direction with the base-line, and the angle β denotes the angle enclosed therebetween. Finally, the distance from each source $S_i$ and A is denoted $r_i$ and the angle formed by incident light from each relative to the surface of the ESA is denoted $\alpha_i$.

From equations (1) and (3), and given that $E = L_r/d\omega$, the measured output of the pixel detector may be expressed:

$$V_{si} = k \rho \sin \alpha_i \, 1/r_i^2 \qquad (4)$$

where $V_{si}$ is measured, and k is retrieved from a look-up table generated during calibration of the DSCS.

Clearly, $\alpha_i$ may be expressed through simple trigonometry in terms of $r_i$, $(a-a_i)$ and β. Then $r_i$ itself may be expressed in terms of R, $a_i$ and φ, and both a and β may be expressed in terms of R, α and φ. Since $a_i$ is known, and φ is defined by the corresponding detector element position, substitution into equation (4) generates an equality with three unknowns: R, α and ρ. By using the three light sources sequentially, three independent equalities with the same three unknowns may be generated. These equations may then be solved, typically by numerical methods, to derive the values of all three parameters.

As mentioned above, in a real three dimensional case the orientation of the ESA is defined by two angles such that there are four unknown parameters. The DSCS must therefore feature a minimum of four light sources to provide sufficient information to derive all the parameters. Since the additional angle has a non-additive affect on the Lambertian reflection, it is possible to use a fourth light source arranged collinearly with the first three. However, to avoid all ambiguity due to the symmetry of the arrangement, it may be preferable to position at least one source out of alignment from the other sources.

It will be appreciated that the present invention not only provides information about the distance from the camera to each pixel of the image, but also both the value of ρ and the local orientation of the surface at the ESA. This information has important additional applications for material analysis and identification. Furthermore, the angle information recovered may be used in self-checking algorithms and/or for precise interpolation to generate an extremely accurate surface map of the object in the image.

Figure 5:
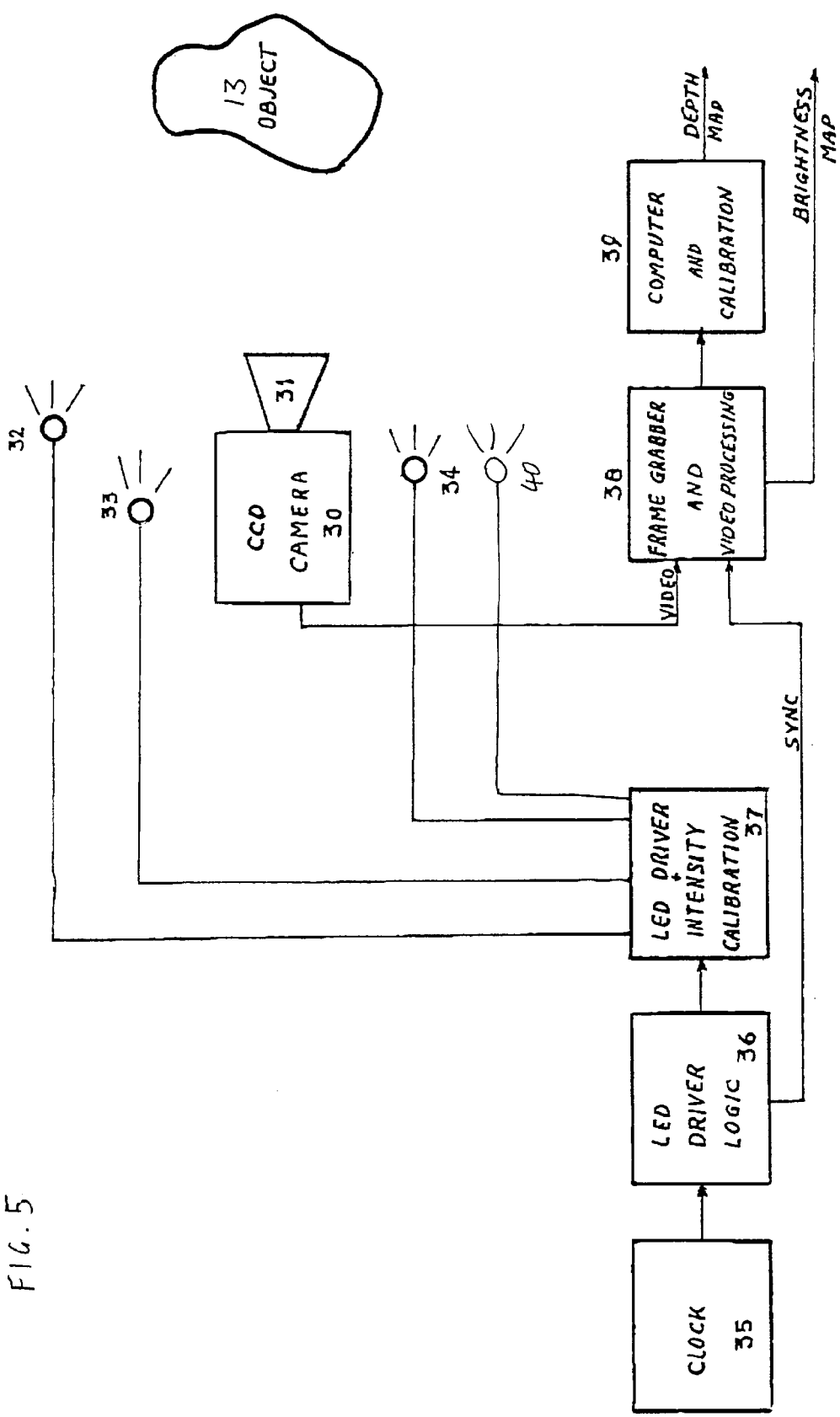
FIG. 5 is a block diagram showing the main components of a depth sensing camera system, constructed and operative according to the teachings of the present invention.

Turning now to FIG. 5, this shows a typical implementation of a depth sensing camera system, generally designated 28, constructed and operative according to the teachings of the present invention. Depth sensing camera system 28 features a CCD camera 30 with collecting optics 31, arranged in known relation to three or more LED's 32, 33, 34 and 40. A central clock 35 drives a synchronization input to LED driver logic 36. Driver logic 36 controls a LED driver/intensity calibration block 37, as well as synchronizing a frame grabber/video processing unit 38. Frame grabber/video processing unit 38 provides the input for a coordinate computing unit 39, as well as producing a direct output of a video image brightness map.

Each of the above-mentioned components is in itself well known, and the details of the structure and function of each will be clear to one ordinarily skilled in the art, in view of the above description.

It should be noted that the system and method of the present invention may readily be refined to cater for specific problematic scenarios. For example, up to this point, the assumption was made that the observed scene included purely Lambertian surfaces. In practice, there are no purely Lambertian solid reflectors and there is always a finite probability that a specular reflection generated in one or more ESA will reach the camera due to a particular point source/camera/object geometry. Such reflections may lead to a major error in calculating the distance to the corresponding ESA and appear as a discontinuity in the object surface. Single pixel, or local, discontinuities can usually be smoothed out based on prior knowledge of the expected object by the equivalent of a spatial low pass filter. A further way to combat potential specular reflections is to augment the point source array with additional redundant light sources. These redundant sources enable the generation of additional solutions for the pixel depths which can then be compared to the previous solutions. If the solutions coincide, there is a high probability that they are valid. If they do not coincide, additional light sources may be operated to obtain additional solutions and, if necessary, decision logic such as "majority vote" may be employed to select a solution.

Another valuable feature of the system and apparatus of the present invention is that it yields information about the local surface inclination at each ESA. This information may be useful in a number of ways such as, for example, for additional interpolation between ESA's to provide enhanced resolution, or to help identify discontinuities.

In certain applications such as product dimensional inspection, it may be preferable to use the DSCS by first performing a number of calibration cycles on samples of acceptable and unacceptable dimensions. The subsequent results may then be compared with the results achieved during calibration. This ensures that any systematic errors caused by secondary reflections or the like are automatically canceled out.

A further example of refinement of the system and method of the present invention relates to errors caused by background illumination. The presence of background illumination causes a shift in the intensity measured by the digital camera for each pixel. In order to correct for this, a calibration intensity map is preferably generated from the digital camera while none of the light sources are operating. This calibration intensity map is then subtracted from each of the measured intensity maps before further calculations are performed.

It should be appreciated that the present invention may be implemented in a number of different forms, without requiring any significant adaptation. For example, the digital camera may be a line detector employing a linear array of detector elements. This is particularly useful for inspection applications and the like when the object scene is moving, such as on a conveyor belt. The system is arranged such that object scene moves relative to the camera in a direction perpendicular to the detector array. As a result, the DSCS scans the object scene as it passes, allowing a full three-dimensional image to be built up.

It will be appreciated that the above descriptions are intended only to serve as examples, and that many other embodiments are possible within the spirit and the scope of the present invention.

What is claimed is:

1. A method for deriving depth information associated with pixels of an image sensed by a digital camera, each pixel corresponding to a surface element of a subject scene, the method comprising the steps of:
   (a) generating a first intensity map of the subject scene while substantially the entirety of the subject scene is illuminated by a first light source positioned in a first known geometrical relation to the digital camera;
   (b) generating a second intensity map of the subject scene while substantially the entirety of the subject scene is illuminated by a second light source positioned in a second known geometrical relation to the digital camera;
   (c) generating a third intensity map of the subject scene while substantially the entirety of the subject scene is illuminated by a third light source positioned in a third known geometrical relation to the digital camera;
   (d) generating a fourth intensity map of the subject scene while substantially the entirety of the subject scene is illuminated by a fourth light source positioned in a fourth known geometrical relation to the digital camera; and
   (e) processing the measured intensity values of corresponding pixels of said first, second, third and fourth intensity maps to derive information relating to the depth of the corresponding surface element of the subject scene, said processing being based upon an inverse square relation between distance and intensity.

2. The method of claim 1, further comprising employing a smoothing algorithm for rejecting local depth errors due to specular reflection.

3. The method of claim 1, further comprising generating additional intensity maps of the subject scene while the subject scene is illuminated by additional light sources each positioned in different known geometrical relation to the digital camera so as to minimize the chance of erroneous depth calculation due to specular reflection.

4. The method of claim 1, further comprising generating a calibration intensity map of the subject scene illuminated only by background illumination, and wherein said processing includes subtracting said calibration intensity map from each of said first, second, and third intensity maps.

5. The method of claim 1, wherein each of said first, second, third and fourth light sources approximates to a point source with respect to the area of the object scene.

6. The method of claim 1, wherein said processing derives information relating to the orientation of said corresponding surface element of the subject scene.

7. The method of claim 1, wherein said processing derives information relating to the Lambertian reflection coefficient of said corresponding surface element of the subject scene.

8. A depth sensing camera system for generating three-dimensional information about an object scene, the system comprising:

(a) a digital camera having a field of view including the object scene;

(b) a first light source positioned in a first known geometrical relation to said digital camera for illuminating substantially the entirety of the object scene;

(c) a second light source positioned in a second known geometrical relation to said digital camera for illuminating substantially the entirety of the object scene;

(d) a third light source positioned in a third known geometrical relation to said digital camera for illuminating substantially the entirety of the object scene;

(e) a fourth light source positioned in a fourth known geometrical relation to said digital camera for illuminating substantially the entirety of the object scene;

(f) a control system for sequentially activating each of said light sources such that said digital camera generates a first image of the object scene illuminated by said first light source, a second image of the object scene illuminated by said second light source, a third image of the object scene illuminated by said third light source, and a fourth image of the object scene illuminated by said fourth light source; and (g) a processor configured to process said first, second, third and fourth images based upon an inverse square relation between distance and intensity to derive depth information relating to at least some points of the object scene.

9. The system as in claim 8, wherein said first, second and third light sources are arranged substantially collinearly.

10. The system as in claim 8, wherein each of said light sources approximates to a point source with respect to the area of the object scene.

11. The system of claim 8, wherein each of said light sources is an LED.

12. The system of claim 8, wherein each of said light sources is an illuminated optical fiber.

13. The system of claim 8, wherein said digital camera is a line detector employing a linear array of detector elements, the system further comprising means for generating relative movement of the object scene relative to said digital camera in a direction perpendicular to said linear array.

* * * * *